(12) United States Patent
Hwang et al.

(10) Patent No.: US 10,487,920 B2
(45) Date of Patent: Nov. 26, 2019

(54) PLANETARY GEAR TRAIN OF AUTOMATIC TRANSMISSION FOR VEHICLES

(71) Applicants: Hyundai Motor Company, Seoul (KR); Kia Motors Corporation, Seoul (KR)

(72) Inventors: Seong Wook Hwang, Gunpo-si (KR); Ki Tae Kim, Incheon (KR); Juhyeon Park, Suwon-si (KR); Hyun Sik Kwon, Seoul (KR); Ilhan Yoo, Seongnam-si (KR); Seongwook Ji, Gunpo-si (KR); Wonmin Cho, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 225 days.

(21) Appl. No.: 15/831,586

(22) Filed: Dec. 5, 2017

(65) Prior Publication Data

US 2019/0107177 A1    Apr. 11, 2019

(30) Foreign Application Priority Data

Oct. 11, 2017    (KR) .......................... 10-2017-0130633

(51) Int. Cl.
*F16H 3/66*    (2006.01)
*F16H 3/36*    (2006.01)

(52) U.S. Cl.
CPC ............ *F16H 3/666* (2013.01); *F16H 3/363* (2013.01); *F16H 2200/0069* (2013.01); *F16H 2200/201* (2013.01); *F16H 2200/2012* (2013.01); *F16H 2200/2023* (2013.01); *F16H 2200/2046* (2013.01)

(58) Field of Classification Search
CPC ............ F16H 3/666; F16H 2200/2046; F16H 2200/2012; F16H 2200/0069; F16H 2200/201; F16H 2200/2023; F16H 3/663
USPC ................................ 475/275–292, 330, 341
See application file for complete search history.

(56) References Cited

FOREIGN PATENT DOCUMENTS

JP    2015-183793 A    10/2015

*Primary Examiner* — Jeffrey A Shapiro
(74) *Attorney, Agent, or Firm* — Morgan, Lewis & Bockius LLP

(57) ABSTRACT

A planetary gear train may include input and output shafts a compound planetary gear set having first, second, third and fourth rotation elements by combination of first and second planetary gear sets; a third planetary gear set having fifth, sixth, and seventh rotation elements; a fourth planetary gear set having eighth, ninth, and tenth rotation elements, the first rotation element selectively connectable to the fifth rotation element and the tenth rotation element, respectively, the second rotation element and the tenth rotation element selectively connectable to the transmission housing, the third rotation element fixedly connected to the sixth rotation element, and fixedly connected to the input shaft, the fourth rotation element selectively connectable to the seventh shaft, the fifth rotation element fixedly connected to the eighth shaft, the seventh rotation element selectively connectable to the ninth shaft, the ninth rotation element fixedly connected to the output shaft.

9 Claims, 2 Drawing Sheets

FIG. 2

| Shift-stage | Control element | | | | | | Gear ratio |
|---|---|---|---|---|---|---|---|
| | C1 | C2 | C3 | C4 | B1 | B2 | |
| D1 |  | ● | ● |  |  | ● | 5.091 |
| D2 |  |  | ● |  | ● | ● | 3.294 |
| D3 |  | ● |  |  | ● | ● | 2.371 |
| D4(1) | ● |  |  |  | ● | ● | 1.985 |
| D4(2) | ● | ● |  |  |  | ● | 1.985 |
| D5 | ● | ● |  |  | ● |  | 1.571 |
| D6 | ● |  | ● |  | ● |  | 1.209 |
| D7 | ● |  | ● | ● |  |  | 1.000 |
| D8 | ● |  |  | ● | ● |  | 0.787 |
| D9 |  |  | ● | ● | ● |  | 0.647 |
| D10 |  | ● |  | ● | ● |  | 0.601 |
| REV |  | ● |  | ● |  | ● | -4.617 |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2017-0130633 filed on Oct. 11, 2017, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission for a vehicle having advantages of, by minimal complexity, realizing ten forward speeds, improving power delivery performance and fuel consumption due to multi-stages, and improving driving stability of a vehicle by utilizing a low rotation speed of an engine.

Description of Related Art

Generally, in automatic transmission field, achieving more shift stages is a technology for maximizing fuel consumption and driving efficiency and has been researched, and recent increases in oil prices are triggering hard competition in enhancing fuel consumption of a vehicle.

In this sense, research on an engine has been undertaken to achieve weight reduction and to enhance fuel consumption by so-called downsizing, and research on an automatic transmission has been performed to simultaneously provide better drivability and fuel consumption by achieving more shift stages.

To achieve more shift stages for an automatic transmission, the number of parts, particularly the number of planetary gear sets is typically increased and installability, production cost, weight, and power flow efficiency according to total length of transmission is increased.

Therefore, to maximally enhance fuel consumption of an automatic transmission having more shift stages, it is important for better efficiency to be derived by fewer number of parts.

In the present respect, an eight-speed automatic transmission has been recently introduced, and a planetary gear train for an automatic transmission facilitating more shift stages is continuously required.

However, the majority of general automatic transmissions having more than eight speeds include three to four planetary gear sets and five to seven control elements (friction element), in the instant case, total length is increased, which has drawbacks of deteriorating installability.

As a result, plural rows structure which planetary gear sets are on planetary gear sets has been adopted, or a dog clutch is applied in place of wet control elements. However, in the instant case, applicable structure is restricted and shift feel deteriorates by applying the dog clutch.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of obtaining shift-stages of the forward ten speeds by minimal number of parts, improving power delivery performance and fuel consumption by multi-stages of an automatic transmission, and improving driving stability of a vehicle by utilizing a low rotation speed of an engine.

A planetary gear train according to an exemplary embodiment of the present invention may include an input shaft receiving an engine torque; an output shaft outputting a torque; a compound planetary gear set having first, second, third and fourth rotation elements by combination of a first planetary gear set and a second planetary gear set; a third planetary gear set having fifth, sixth, and seventh rotation elements; a fourth planetary gear set having eighth, ninth, and tenth rotation elements; a first shaft fixedly connected to the third rotation element and the sixth rotation element, and fixedly connected to the input shaft; a second shaft fixedly connected to the ninth rotation element, and fixedly connected to the output shaft; a third shaft fixedly connected to the first rotation element; a fourth shaft fixedly connected to the fourth rotation element; a fifth shaft fixedly connected to the fifth rotation element and the eighth rotation element; a sixth shaft fixedly connected to the seventh rotation element; and a plurality of shafts, each of which is selectively connectable to the transmission housing and fixedly connected to a rotation element of the compound planetary gear set and the fourth planetary gear set which is not fixedly connected to any of the first to six shafts.

Here, the plurality of shafts comprise: a seventh shaft fixedly connected to the second rotation element, and selectively connectable to the transmission housing; and an eighth shaft fixedly connected to the tenth rotation element, and selectively connectable to the transmission housing, wherein the second shaft is selectively connectable to the sixth shaft, the fourth shaft is selectively connectable to the sixth shaft, the third shaft is selectively connectable to the fifth shaft, and the third shaft is selectively connectable to the eighth shaft.

The planetary gear train further may include four clutches selectively connecting two shafts among the first to the eighth shaft; and two brakes selectively connecting the seventh shaft and the eighth shaft to the transmission housing, respectively.

At the present time, the four clutches include a first clutch disposed between the second shaft and the sixth shaft; a second clutch disposed between the fourth shaft and the sixth shaft; a third clutch disposed between the third shaft and the fifth shaft; and a fourth clutch disposed between the third shaft and the eighth shaft, the two brake include a first brake disposed between the seventh shaft and the transmission housing; and a second brake disposed between the eighth shaft and the transmission housing.

Furthermore, the compound planetary gear set is a combination of the first planetary gear set which is a single pinion planetary gear set and the second planetary gear set which is a double pinion planetary gear set, and the first, second, third and fourth rotation elements are respectively a first sun gear, a second sun gear, a sharing planet carrier, and a sharing ring gear, the third planetary gear set is a single pinion planetary gear set, and the fifth, sixth, and seventh rotation elements are respectively a third sun gear, a third planet carrier, and a third ring gear, the fourth planetary gear set is a single pinion planetary gear set, and the eighth, ninth, and tenth rotation elements are respectively a fourth sun gear, a fourth planet carrier, and a fourth ring gear.

A planetary gear train of an automatic transmission for a vehicle according to an exemplary embodiment of the present invention, shift-stages of forward ten speeds and one reverse speed may be realized by combination of one compound planetary gear set, two simple planetary gear sets and six control elements.

Furthermore, a planetary gear train according to an exemplary embodiment of the present invention may realize shift stages appropriate for rotation speed of an engine due to multi-stages of an automatic transmission and improve driving stability of a vehicle by utilizing a low rotation speed of an engine.

Furthermore, a planetary gear train according to an exemplary embodiment of the present invention maximize engine driving efficiency by multi-stages of an automatic transmission, and may improve power delivery performance and fuel consumption.

Furthermore, effects that can be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for respective control elements at respective shift stages in a planetary gear train according to an exemplary embodiment of the present invention.

Figure 1:
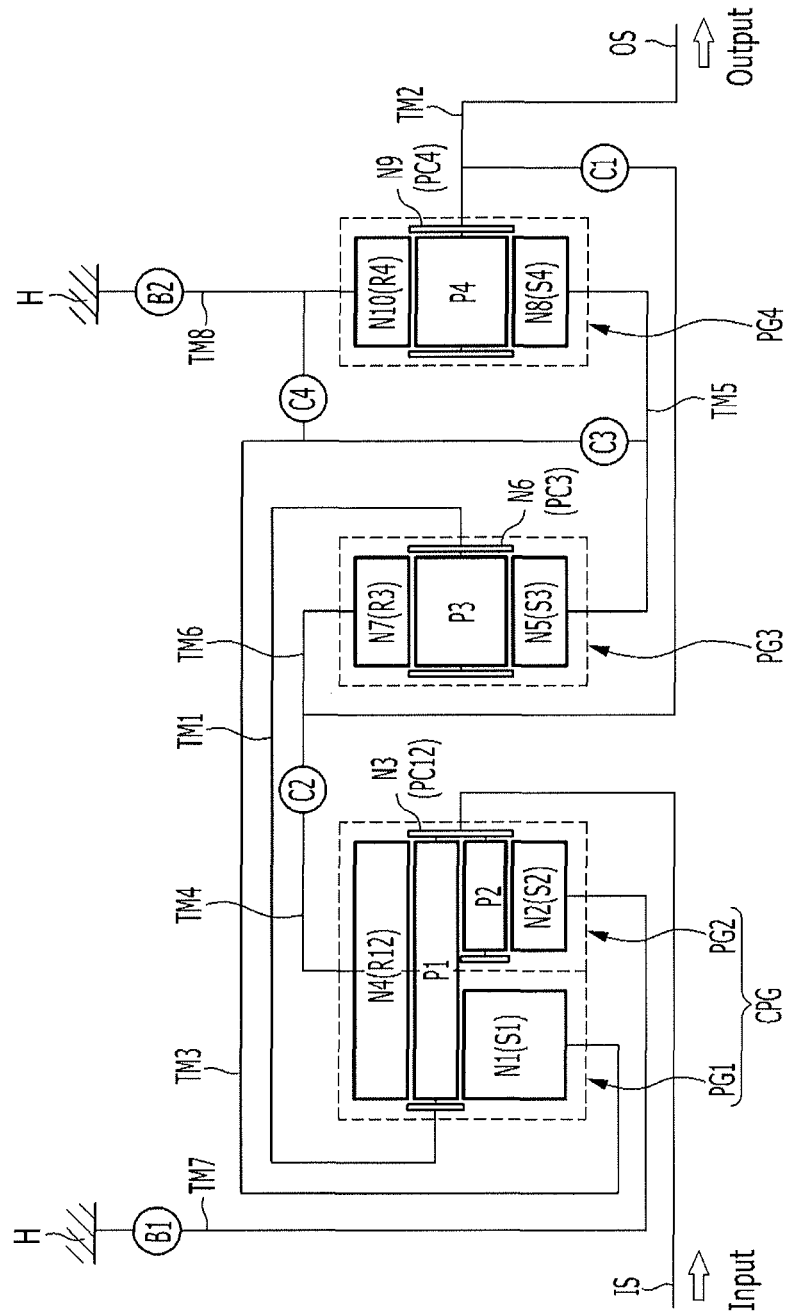
FIG. 1 is a schematic diagram of a planetary gear train according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described more specifically with reference to drawings.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited.

FIG. 1 is a schematic diagram of a planetary gear train according to an exemplary embodiment of the present invention.

Referring to FIG. 1, a planetary gear train according to various exemplary embodiments of the present invention includes first, second, third and fourth planetary gear sets PG1, PG2, PG3, and PG4 disposed on a same axis, an input shaft IS, an output shaft OS, eight shafts TM1 to TM8 connected to rotation elements of the first, second, third and fourth planetary gear sets PG1, PG2, PG3, and PG4, four clutches C1 to C4 and two brakes B1 and B2 as control elements, and a transmission housing H.

Torque input from the input shaft IS is shifted by cooperative operation of the first, second, third and fourth planetary gear sets PG1, PG2, PG3, and PG4, and then output through the output shaft OS.

In an exemplary embodiment of the present invention, the planetary gear sets are disposed in the order of first, second, third and fourth planetary gear sets PG1, PG2, PG3 and PG4, from an engine side.

Here, the first and second planetary gear sets PG1 and PG2 are combined with each other to be one compound planetary gear set CPG.

The input shaft IS is an input member and the torque from a crankshaft of an engine, after being torque-converted through a torque converter, is input into the input shaft IS.

The output shaft OS is an output element, and being disposed on a same axis with the input shaft IS, delivers a shifted torque to a driveshaft through a differential apparatus which is not illustrated.

The compound planetary gear set CPG is a combination of the first planetary gear set which is a single pinion planetary gear set and the second planetary gear set which is a double pinion planetary gear set, and is a Ravingneaux type compound planetary gear set.

Accordingly, the compound planetary gear set CPG operates by four rotation elements including a ring gear, a planet carrier, and two sun gears. The compound planetary gear set CPG includes a first sun gear S1 engaged with a plurality of long pinion gear P1, a second sun gear S2 engaged with a plurality of short pinion gear P2, a plurality of long pinion gear P1 externally engaged with the first sun gear S1, a sharing planet carrier PC12 supports the plurality of short pinion gear P2 externally engaged with the second sun gear S2, and a sharing ring gear R12 internally engaged with the plurality of the long pinion gear P1 to be torque-connected to the first and second sun gears S1 and S2. The first sun gear S1 acts as a first rotation element N1, the second sun gear S2 acts as a second rotation element N2, the sharing planet carrier PC12 acts as a third rotation element N3, and the sharing ring gear R12 acts as a fourth rotation element N4.

The third planetary gear set PG3 is a single pinion planetary gear set, and includes a third sun gear S3, a third planet carrier PC3 that supports a plurality of third pinion gear P3 externally engaged with the third sun gear S3 so that the third pinion gear P3 may rotate and revolute, and a third ring gear R3 internally engaged with the plurality of the third pinion gear P3 to be torque-connected to the third sun gear S3. The third sun gear S3 acts as a fifth rotation element N5, the third planet carrier PC3 acts as a sixth rotation element N6, and the third ring gear R3 acts as a seventh rotation element N7.

The fourth planetary gear set PG4 is a single pinion planetary gear set, and includes a fourth sun gear S4, a fourth planet carrier PC4 that supports a plurality of fourth pinion gear P4 externally engaged with the fourth sun gear S4 so that the fourth pinion gear P4 may rotate and revolve, and a fourth ring gear R4 internally engaged with the plurality of the fourth pinion gear P4 to be torque-connected to the fourth sun gear S4. The fourth sun gear S4 acts as an eighth rotation element N8, the fourth planet carrier PC4 acts as a ninth rotation element N9, and the fourth ring gear R4 acts as a tenth rotation element N10.

In the arrangement of the first, second, third and fourth planetary gear sets PG1, PG2, PG3, and PG4, the third rotation element N3 is fixedly connected to the sixth rotation element N6, and the fifth rotation element N5 is fixedly connected to the eighth rotation element N8 by eight shafts TM1 to TM8.

The eight shafts TM1 to TM8 are disposed as follows.

The first shaft TM1 is fixedly connected to the third rotation element N3 (the sharing planet carrier PC12) and the sixth rotation element N6 (the third planet carrier PC3), and fixedly connected to the input shaft IS, always acting as an input element.

The second shaft TM2 is fixedly connected to the ninth rotation element N9 (the fourth planet carrier PC4), and fixedly connected to the output shaft OS, always acting as an output element.

The third shaft TM3 is fixedly connected to the first rotation element N1 (the first sun gear S1).

The fourth shaft TM4 is fixedly connected to the fourth rotation element N4 (the sharing ring gear R12).

The fifth shaft TM5 is fixedly connected to the fifth rotation element N5 (the third sun gear S3) and the eighth rotation element N8 (the fourth sun gear S4).

The sixth shaft TM6 is fixedly connected to the seventh rotation element N7 (the third ring gear R3).

The seventh shaft TM7 is fixedly connected to the second rotation element N2 (the second sun gear S2).

The eighth shaft TM8 is fixedly connected to the tenth rotation element N10 (the fourth ring gear R4).

Each of the eighth shafts TM1 to TM8 may be a rotation member that delivers torque and rotates with rotation element which fixedly or selectively interconnects a plurality of the rotation elements of the rotation elements of the planetary gear sets PG1, PG2, PG3, and PG4, and the eight shafts TM1 to TM8 may be a rotation member selectively connecting the rotation element with the transmission housing H, or be a fixed member directly connecting and fixing the rotation element with the transmission housing H.

In the disclosure, in the above description, the term "fixedly connected" or similar term signifies that a plurality of rotation elements including the input and output shafts, which are connected through the corresponding shafts, and the corresponding shaft are connected to rotate without any difference in the number of revolutions. That is, a plurality of fixedly connected rotation elements and corresponding shafts rotate in the same rotation direction and number of revolutions.

Furthermore, in the above description, the term "selectively connectable" or similar terms signify that a plurality of shafts, including an input and output shafts, are connected to each other to be rotatable in the same rotation direction and number of revolutions through engagement elements, or the corresponding shaft is fixedly connected to the transmission housing via the engagement element.

That is, when the engagement element operates to selectively connect a plurality of the shafts, the plurality of the shafts rotate in the same rotation direction and number of revolutions. Conversely, when the engagement element is released, the connection of the plurality of the shafts is released.

Furthermore, when the engagement element operates to selectively connect the corresponding shaft and the transmission housing, the corresponding shaft is fixedly connected to the transmission housing. Conversely, when the engagement element is released, the corresponding shaft is in a rotatable state.

Here, the third shaft TM3 is selectively connectable to the fifth shaft TM5 and the eighth shaft TM8, respectively, and the sixth shaft TM6 is selectively connectable to the second shaft TM2 and the fourth shaft TM4, respectively.

Furthermore, the seventh shaft TM7 and the eighth shaft TM8 are selectively connectable to the transmission housing H respectively to act as a selective fixed element.

The eight shafts TM1 to TM8, the input shaft IS, and the output shaft OS may be selectively interconnected to one another by control elements of four clutches C1 to C4.

Furthermore, the eight shafts TM1 to TM8 may be selectively connectable to the transmission housing H, by control elements of two brakes B1 and B2.

The four clutches C1 to C4 and the two brakes B1 and B2 are disposed as follows.

The first clutch C1 is disposed between the second shaft TM2 and the sixth shaft TM6, and selectively connects the second shaft TM2 and the sixth shaft TM6, controlling power delivery therebetween.

The second clutch C2 is disposed between the fourth shaft TM4 and the sixth shaft TM6, and selectively connects the fourth shaft TM4 and the sixth shaft TM6, controlling power delivery therebetween.

The third clutch C3 is disposed between the third shaft TM3 and the fifth shaft TM5, and selectively connects the third shaft TM3 and the fifth shaft TM5, controlling power delivery therebetween.

The fourth clutch C4 is disposed between the third shaft TM3 and the eighth shaft TM8, and selectively connects the third shaft TM3 and the eighth shaft TM8, controlling power delivery therebetween.

The first brake B1 is disposed between the seventh shaft TM7 and the transmission housing H, and selectively connects the seventh shaft TM7 to the transmission housing H.

The second brake B2 is disposed between the eighth shaft TM8 and the transmission housing H, and selectively connects the eighth shaft TM8 to the transmission housing H.

The engagement elements of the first, second, third and fourth clutches C1, C2, C3, and C4 and the first and second brakes B1 and B2 may be realized as multi-plate hydraulic pressure friction devices that are frictionally engaged by hydraulic pressure, however, it may not be understood to be limited thereto, since various other configuration that are electrically controllable may be available.

FIG. 2 is an operational chart for respective control elements at respective shift stages in a planetary gear train according to an exemplary embodiment of the present invention.

Referring to FIG. 2, a planetary gear train according to an exemplary embodiment of the present invention realizes ten forward speeds and at least one reverse speed by operating three engagements among the first, second and third clutches C1, C2, C3 and C4 and first and second brake B1 and B2.

In the first forward speed shift-stage D1, the second and third clutches C2 and C3 and the second brake B2 are simultaneously operated.

As a result, the third shaft TM3 is fixedly connected to the fifth shaft TM5 by the operation of the third clutch C3, and the fourth shaft TM4 is fixedly connected to the sixth shaft TM6 by the operation of the second clutch C2. In the present state, torque of the Input shaft IS is input to the first shaft TM2.

Furthermore, the eighth shaft TM8 acts as a fixed element by the operation of the second brake B2, realizing the first forward speed and outputting a shifted torque to the output shaft OS connected to the second shaft TM2.

In the second forward speed shift-stage D2, the third clutch C3 and the first and second brakes B1 and B2 are simultaneously operated.

As a result, the third shaft TM3 is fixedly connected to the fifth shaft TM5 by the operation of the third clutch C3. In the present state, torque of the Input shaft IS is input to the first shaft TM1.

Furthermore, the seventh shaft TM7 and the eighth shaft TM8 act as fixed elements by the operation of the first and second brakes B1 and B2, realizing the second forward speed and outputting a shifted torque to the output shaft OS connected to the second shaft TM2.

In the third forward speed shift-stage D3, the second clutch C2 and the first and second brakes B2 and B3 are simultaneously operated.

As a result, the fourth shaft TM4 is fixedly connected to the sixth shaft TM6 by the operation of the second clutch C2. In the present state, torque of the Input shaft IS is input to the first shaft TM1.

Furthermore, the seventh shaft TM7 and the eighth shaft TM8 act as fixed elements by the operation of the first and second brakes B1 and B2, realizing the third forward speed and outputting a shifted torque to the output shaft OS connected to the second shaft TM2.

The fourth speed shift-stage D4 may be realized by two methods.

In the first method (D4(1)) realizing the fourth forward speed shift-stage D4, the first clutch C1 and the first and second brakes B1 and B2 are simultaneously operated.

As a result, the second shaft TM2 is fixedly connected to the sixth shaft TM6 by the operation of the first clutch C1. In the present state, torque of the Input shaft IS is input to the first shaft TM1.

Furthermore, the seventh shaft TM7 and the eighth shaft TM8 act as fixed elements by the operation of the first and second brakes B1 and B2, realizing the fourth forward speed and outputting a shifted torque to the output shaft OS connected to the second shaft TM2.

In the second method (D4(2)) realizing the fourth forward speed shift-stage D4, the first clutch and second clutch C1 and C2 and the second brake B2 are simultaneously operated.

As a result, the second shaft TM2 is fixedly connected to the sixth shaft TM6 by the operation of the first clutch C1, and the fourth shaft TM4 is fixedly connected to the sixth shaft TM6 by the operation of the second clutch C2. In the present state, torque of the Input shaft IS is input to the first shaft TM1.

Furthermore, the eighth shaft TM8 acts as a fixed element by the operation of the second brake B2, realizing the fourth forward speed and outputting a shifted torque to the output shaft OS connected to the second shaft TM2.

In the fifth forward speed shift-stage D5, the first clutch and second clutch C1 and C2 and the first brake B1 are simultaneously operated.

As a result, the second shaft TM2 is fixedly connected to the sixth shaft TM6 by the operation of the first clutch C1, and the fourth shaft TM4 is fixedly connected to the sixth shaft TM6 by the operation of the second clutch C2. In the present state, torque of the Input shaft IS is input to the first shaft TM1.

Furthermore, the seventh shaft TM7 acts as a fixed element by the operation of the first brake B1, realizing the fifth forward speed and outputting a shifted torque to the output shaft OS connected to the second shaft TM2.

In the sixth forward speed shift-stage D6, the first and third clutches C1 and C3 and the first brake B1 are simultaneously operated.

As a result, the second shaft TM2 is fixedly connected to the sixth shaft TM6 by the operation of the first clutch C1, and the third shaft TM3 is fixedly connected to the fifth shaft TM5 by the operation of the third clutch C3. In the present state, torque of the Input shaft IS is input to the first shaft TM1.

Furthermore, the seventh shaft TM7 acts as a fixed element by the operation of the first brake B1, realizing the sixth forward speed and outputting a shifted torque to the output shaft OS connected to the second shaft TM2.

In the seventh forward speed shift-stage D7, the first, third, and fourth clutches C1, C3, and C4 are simultaneously operated.

As a result, the second shaft TM2 is fixedly connected to the sixth shaft TM6 by the operation of the first clutch C1, and the third shaft TM3 is fixedly connected to the fifth shaft TM5 by the operation of the third clutch C3, and the third shaft TM3 is fixedly connected to the eighth shaft TM8 by the operation of the fourth clutch C4.

As such, the first, second, third and fourth planetary gear sets PG1, PG2, PG3, and PG4 integrally rotate, and the torque received at the first shaft TM1 is outputted as inputted, realizing the seventh forward speed and outputting a shifted torque through the output shaft OS connected to the second shaft TM2.

In the first forward speed shift-stage D8, the first and fourth clutches C1 and C4 and the first brake B1 are simultaneously operated.

As a result, the second shaft TM2 is fixedly connected to the sixth shaft TM6 by the operation of the first clutch C1, and the third shaft TM3 is fixedly connected to the eighth shaft TM8 by the operation of the fourth clutch C4. In the present state, torque of the Input shaft IS is input to the first shaft TM1.

Furthermore, the seventh shaft TM7 acts as a fixed element by the operation of the first brake B1, realizing the eighth forward speed and outputting a shifted torque to the output shaft OS connected to the second shaft TM2.

In the ninth forward speed shift-stage D9, the third and fourth clutches C3 and C4 and the first brake B1 are simultaneously operated.

As a result, the third shaft TM3 is fixedly connected to the fifth shaft TM5 by the operation of the third clutch C3, and the third shaft TM3 is fixedly connected to the eighth shaft TM8 by the operation of the fourth clutch C4. In the present state, torque of the Input shaft IS is input to the first shaft TM1.

Furthermore, the seventh shaft TM7 acts as a fixed element by the operation of the first brake B1, realizing the ninth forward speed and outputting a shifted torque to the output shaft OS connected to the second shaft TM2.

In the tenth forward speed shift-stage D10, the second and fourth clutches C2 and C4 and the first brake B1 are simultaneously operated.

As a result, the fourth shaft TM4 is fixedly connected to the sixth shaft TM6 by the operation of the second clutch C2, and the third shaft TM3 is fixedly connected to the eighth shaft TM8 by the operation of the fourth clutch C4. In the present state, torque of the Input shaft IS is input to the first shaft TM1.

Furthermore, the seventh shaft TM7 acts as a fixed element by the operation of the first brake B1, realizing the tenth forward speed and outputting a shifted torque to the output shaft OS connected to the second shaft TM2.

In the reverse speed REV, the second and fourth clutches C2 and C4, and the second brake B2 are simultaneously operated.

As a result, the fourth shaft TM4 is fixedly connected to the sixth shaft TM6 by the operation of the second clutch C2, and the third shaft TM3 is fixedly connected to the eighth shaft TM8 by the operation of the fourth clutch C4. In the present state, torque of the Input shaft IS is input to the first shaft TM1.

Furthermore, the eighth shaft TM8 acts as a fixed element by the operation of the second brake B2, realizing the reverse speed and outputting a shifted torque to the output shaft OS connected to the second shaft TM2.

As described above, a planetary gear train according to an exemplary embodiment of the present invention may realize forward ten speeds and a reverse one speed formed by operating four planetary gear sets PG1, PG2, PG3, and PG4 by controlling the four clutches C1, C2, C3, and C4 and the two brakes B1 and B2.

Furthermore, a planetary gear train according to an exemplary embodiment of the present invention may realize shift stages appropriate for rotation speed of an engine due to multi-stages of an automatic transmission and improve driving stability of a vehicle by utilizing a low rotation speed of an engine.

Furthermore, a planetary gear train according to an exemplary embodiment of the present invention may maximize engine driving efficiency by multi-stages of an automatic transmission, and may improve power delivery performance and fuel consumption.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train apparatus of an automatic transmission for a vehicle, comprising:
   an input shaft receiving an engine torque;
   an output shaft outputting a torque;
   a compound planetary gear set having first, second, third and fourth rotation elements by combination of a first planetary gear set and a second planetary gear set;
   a third planetary gear set having fifth, sixth, and seventh rotation elements;
   a fourth planetary gear set having eighth, ninth, and tenth rotation elements;
   a first shaft fixedly connected to the third rotation element and the sixth rotation element, and fixedly connected to the input shaft;
   a second shaft fixedly connected to the ninth rotation element, and fixedly connected to the output shaft;
   a third shaft fixedly connected to the first rotation element;
   a fourth shaft fixedly connected to the fourth rotation element;
   a fifth shaft fixedly connected to the fifth rotation element and the eighth rotation element;
   a sixth shaft fixedly connected to the seventh rotation element; and
   a plurality of shafts, each of which is selectively connectable to a transmission housing and fixedly connected to a rotation element of the compound planetary gear set and the fourth planetary gear set which is not fixedly connected to any of the first to six shafts.

2. The planetary gear train apparatus of claim 1, wherein the plurality of shafts comprise:
   a seventh shaft fixedly connected to the second rotation element, and selectively connectable to the transmission housing; and
   an eighth shaft fixedly connected to the tenth rotation element, and selectively connectable to the transmission housing,
   wherein the second shaft is selectively connectable to the sixth shaft, the fourth shaft is selectively connectable to the sixth shaft, the third shaft is selectively connectable to the fifth shaft, and the third shaft is selectively connectable to the eighth shaft.

3. The planetary gear train apparatus of claim 2, further including:
   four clutches selectively connecting two shafts among the first to the eighth shaft; and
   two brakes selectively connecting the seventh shaft and the eighth shaft to the transmission housing, respectively.

4. The planetary gear train apparatus of claim 3,
   wherein the four clutches include:
   a first clutch mounted between the second shaft and the sixth shaft;
   a second clutch mounted between the fourth shaft and the sixth shaft;
   a third clutch mounted between the third shaft and the fifth shaft; and
   a fourth clutch mounted between the third shaft and the eighth shaft, and wherein the two brake include:
   a first brake mounted between the seventh shaft and the transmission housing; and
   a second brake mounted between the eighth shaft and the transmission housing.

5. The planetary gear train apparatus of claim 1, wherein the compound planetary gear set includes the first planetary gear set which is a single pinion planetary gear set and the second planetary gear set which is a double pinion planetary gear set, and the first, second, third and fourth rotation elements are a first sun gear, a second sun gear, a sharing planet carrier, and a sharing ring gear, respectively, the third planetary gear set is a single pinion planetary gear set, and the fifth, sixth, and seventh rotation elements are a third sun gear, a third planet carrier, and a third ring gear, respectively, and the fourth planetary gear set is a single pinion planetary gear set, and the eighth, ninth, and tenth rotation elements are a fourth sun gear, a fourth planet carrier, and a fourth ring gear, respectively.

6. A planetary gear train apparatus of an automatic transmission for a vehicle, comprising:

an input shaft receiving an engine torque;

an output shaft outputting a torque;

a compound planetary gear set having first, second, third and fourth rotation elements by combination of a first planetary gear set and a second planetary gear set;

a third planetary gear set having fifth, sixth, and seventh rotation elements;

a fourth planetary gear set having eighth, ninth, and tenth rotation elements, the first rotation element is selectively connectable to the fifth rotation element and the tenth rotation element, respectively, the second rotation element and the tenth rotation element are selectively connectable to a transmission housing, the third rotation element is fixedly connected to the sixth rotation element, and fixedly connected to the input shaft, the fourth rotation element is selectively connectable to the seventh rotation element, the fifth rotation element is fixedly connected to the eighth rotation element, the seventh rotation element is selectively connectable to the ninth rotation element, the ninth rotation element is fixedly connected to the output shaft.

7. The planetary gear train apparatus of claim 6, further including:

four clutches selectively connecting predetermined rotation elements of the first to tenth rotation elements; and two brakes selectively connecting the second rotation element and the tenth rotation element to the transmission housing, respectively.

8. The planetary gear train apparatus of claim 7, wherein the four clutch include:

a first clutch mounted between the seventh rotation element and the ninth rotation element;

a second clutch mounted between the fourth rotation element and the seventh rotation element;

a third clutch mounted between the first rotation element and the fifth rotation element; and a fourth clutch mounted between the first rotation element and the tenth rotation element, and wherein the two brake include:

a first brake mounted between the second rotation element and the transmission housing; and a second brake mounted between the tenth rotation element and the transmission housing.

9. The planetary gear train apparatus of claim 6, wherein the compound planetary gear set is a combination of the first planetary gear set which is a single pinion planetary gear set and the second planetary gear set which is a double pinion planetary gear set, and the first, second, third and fourth rotation elements are respectively a first sun gear, a second sun gear, a sharing planet carrier, and a sharing ring gear, respectively, the third planetary gear set is a single pinion planetary gear set, and the fifth, sixth, and seventh rotation elements are a third sun gear, a third planet carrier, and a third ring gear, respectively, and the fourth planetary gear set is a single pinion planetary gear set, and the eighth, ninth, and tenth rotation elements are a fourth sun gear, a fourth planet carrier, and a fourth ring gear, respectively.

* * * * *